(12) United States Patent
Fridley

(10) Patent No.: US 8,708,688 B2
(45) Date of Patent: Apr. 29, 2014

(54) THERMALLY INSULATED DIE PLATE ASSEMBLY FOR UNDERWATER PELLETIZING AND THE LIKE

(75) Inventor: Michael A. Fridley, Eagle Rock, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 0 days.

(21) Appl. No.: 13/353,030

(22) Filed: Jan. 18, 2012

(65) Prior Publication Data

US 2012/0207864 A1 Aug. 16, 2012

Related U.S. Application Data

(63) Continuation of application No. 12/222,669, filed on Aug. 13, 2008, now abandoned.

(51) Int. Cl.
*B29C 47/12* (2006.01)

(52) U.S. Cl.
USPC ........... 425/382 R; 425/67; 425/70; 425/311; 425/378.1; 425/464

(58) Field of Classification Search
USPC ............. 425/67, 70, 168, 308, 309, 310, 311, 425/313, 382 R, 464, DIG. 230, 378.1, 425/379.1; 264/141, 142
See application file for complete search history.

(56) References Cited

U.S. PATENT DOCUMENTS

| | | |
|---|---|---|
| 3,599,286 A | 8/1971 | Karet |
| 3,618,162 A | 11/1971 | Scharer |
| 3,867,082 A | 2/1975 | Lambertus |
| 4,123,207 A | 10/1978 | Dudley |
| 4,251,198 A | 2/1981 | Altenburg |
| 4,321,026 A | 3/1982 | Lambertus |
| 4,327,050 A | 4/1982 | Salmon |
| 4,378,964 A | 4/1983 | Wolfe, Jr. |
| 4,500,271 A | 2/1985 | Smith |
| 4,529,370 A | 7/1985 | Holmes et al. |
| 4,564,350 A | 1/1986 | Holmes et al. |
| 4,621,996 A | 11/1986 | Hundley, III |
| 4,728,276 A | 3/1988 | Pauley et al. |
| 4,764,100 A | 8/1988 | Lambertus |
| 4,856,974 A | 8/1989 | Wolfe, Jr. |
| 5,059,103 A | 10/1991 | Bruckmann et al. |

(Continued)

FOREIGN PATENT DOCUMENTS

| | | |
|---|---|---|
| AT | 503 368 | 9/2007 |
| DE | 32 43 332 | 1/1984 |

(Continued)

*Primary Examiner* — Seyed Masoud Malekzadeh
(74) *Attorney, Agent, or Firm* — Jacobson Holman PLLC

(57) ABSTRACT

An insulated die plate assembly for use in underwater pelletizing and other granulation processes includes a thin, continuous air chamber formed across the plate assembly generally parallel to the die face such that the heated upstream portion of the die plate assembly is thermally insulated from the downstream portion. The air chamber is atmospherically equilibrated by venting the air chamber to the atmosphere. The plurality of extrusion orifices, either individually or in groups, are formed in extrusion orifice extensions that extend through the insulation chamber so that the process melt to be granulated can pass therethrough. The orifice extensions and the components forming the air chamber around the orifice extensions channel heat along said extensions to maintain the process melt therein at a desired temperature, to help rigidify the die plate assembly and to better seal the air chamber.

40 Claims, 10 Drawing Sheets

(56) References Cited

U.S. PATENT DOCUMENTS

| | | | |
|---|---|---|---|
| 5,223,279 A * | 6/1993 | Lambertus | 425/186 |
| 5,403,176 A | 4/1995 | Bruckmann et al. | |
| 5,593,702 A | 1/1997 | Harris et al. | |
| 5,611,983 A | 3/1997 | Ma et al. | |
| 5,624,028 A | 4/1997 | Shin et al. | |
| 5,629,028 A | 5/1997 | Trumbull | |
| 5,679,380 A | 10/1997 | Munz et al. | |
| 5,714,713 A | 2/1998 | Hanson | |
| 5,989,009 A | 11/1999 | Matsuo | |
| 6,220,847 B1 | 4/2001 | Yoshida et al. | |
| 6,332,765 B1 | 12/2001 | Spelleken | |
| 6,409,491 B1 | 6/2002 | Leffew et al. | |
| 6,474,969 B1 | 11/2002 | Ready et al. | |
| 6,595,765 B1 | 7/2003 | Lengerich et al. | |
| 6,663,372 B2 | 12/2003 | Ready et al. | |
| 6,793,473 B1 | 9/2004 | Fridley | |
| 6,824,371 B2 | 11/2004 | Smit | |
| 6,925,741 B2 | 8/2005 | Eloo et al. | |
| 6,976,834 B2 | 12/2005 | Knight et al. | |
| 7,033,152 B2 | 4/2006 | Eloo et al. | |
| 7,172,397 B2 | 2/2007 | Fridley | |
| 7,267,540 B2 | 9/2007 | Fridley et al. | |
| 7,318,719 B2 | 1/2008 | Fridley | |
| 7,393,484 B2 | 7/2008 | Martin | |
| 7,402,034 B2 | 7/2008 | Fridley | |
| 7,632,086 B2 | 12/2009 | Veariel et al. | |
| 2003/0031742 A1 | 2/2003 | Smit et al. | |
| 2005/0220920 A1 | 10/2005 | Fridley | |
| 2006/0165834 A1 | 7/2006 | Fridley | |
| 2007/0172535 A1 | 7/2007 | Fridley et al. | |
| 2007/0254059 A1 | 11/2007 | Fridley | |
| 2009/0203840 A1 * | 8/2009 | Martin et al. | 525/50 |

FOREIGN PATENT DOCUMENTS

| | | |
|---|---|---|
| DE | 87 01 490 | 5/1987 |
| DE | 37 02 841 | 8/1987 |
| DE | 196 51 354 | 6/1997 |
| DE | 200 05 026 | 7/2000 |
| DE | 100 02 408 | 7/2001 |
| WO | WO 81/01980 | 7/1981 |
| WO | WO 03/031132 | 4/2003 |
| WO | WO 2006/081140 | 8/2006 |
| WO | WO 2006/087179 | 8/2006 |
| WO | WO 2009/140643 | 11/2009 |

\* cited by examiner

THERMALLY INSULATED DIE PLATE ASSEMBLY FOR UNDERWATER PELLETIZING AND THE LIKE

This application is a continuation application of Ser. No. 12/222,669, filed Aug. 13, 2008 now abandoned, and hereby claims the priority thereof to which it is entitled.

FIELD OF THE INVENTION

The present invention generally relates to an insulated die plate assembly for use in underwater pelletizers and other granulation processes that include hot-face or non-fluidic pelletization. More specifically, the present invention relates to an insulated die plate assembly that includes a thin continuous air pocket or chamber formed across the plate assembly such that the upstream portion of the die plate assembly is thermally insulated from the downstream portion of the same assembly, thus allowing the respective portions to co-exist at different temperatures. The plurality of extrusion orifices, individually or in groups, extend through extrusion orifice extensions that project through the insulation air pocket or chamber so that the material to be pelletized or granulated can pass therethrough.

BACKGROUND OF THE INVENTION AND PRIOR ART

Underwater pelletization equipment and its use following extrusion processing have been implemented for many years by Gala Industries, Inc. ("Gala"), the assignee of the present invention. Pelletization dies and die plates, in particular, are demonstrated in prior art disclosures including, for example, U.S. Pat. Nos. 4,123,207, 4,500,271, 4,621,996, 4,728,276, 5,059,103, 5,403,176, 6,824,371, 7,033,152, U.S. Patent Application Publication Nos. 20060165834 and 20070254059, German Patents and Applications including DE 32 43 332, DE 37 02 841, DE 87 01 490, DE 196 51 354, and World Patent Application Publications WO2006/081140 and WO2006/087179. These patents and applications are all owned by Gala and are expressly incorporated herein by reference as if set forth in their entirety.

As well understood by those skilled in the art, die plates used with rotating cutter hubs and blades, such as in underwater pelletizing, have the extrusion orifices or through die holes arranged in a generally circular pattern, or groups of multiple die holes arranged (as in pods or clusters) in a generally circular array. As so arranged, the rotating blades can cut the extrudate as it exits the die holes along a circular cutting face.

It is known in the field of plastic extrusion and cutting to feed plastic into a die plate for extrusion and solidification upon the exit from the die plate, and then to cut the extruded plastic into small pieces externally of the die plate. However, a known problem consists of the plastic freezing up within the die holes and either partially or completely blocking the passage of the plastic therethrough, with the resulting disruption of the entire operation.

To maintain the polymer at a sufficiently high temperature, insulation is desirable to reduce heat transfer from the extrusion die and the molten polymer being extruded through the extrusion orifices to the water circulating through the water box of the underwater pelletizer. Ineffective insulation can result in excessive cooling of the molten polymer as it is being extruded through the extrusion orifices causing freeze off of the molten polymer at the die face.

U.S. Pat. No. 4,378,964 and World Patent Application Publication No. WO1981/001980 disclose a multi-layer die plate assembly for underwater pelletization of polymeric materials in which an insulation layer, preferably zirconium oxide, is fixedly positioned between the body of the die plate and the layers comprising the cutting face of the die. Adjacent or proximal to the insulation layer is a heating chamber through which is circulated a heating fluid for maintenance of the temperature of the die.

U.S. Pat. No. 4,764,100 discloses a die plate construction specifically described for underwater pelletization of plastic extrudate including a closed insulating space formed between the baseplate and the cutting plate through which penetrates the extrusion nozzles, and optional inserts serve to further strengthen and support the structure.

Vacuum heat insulating cavities between extrusion nozzles are disclosed in U.S. Pat. No. 5,714,713 in a multi-step process that includes electron beam welding while the die components are maintained under high vacuum. This disclosure is extended to vacuum heat insulation portions in areas peripherally external to the extrusion nozzles for enhanced insulation performance in U.S. Pat. No. 5,989,009.

Similarly, closed continuous thermal stabilization cavities filled with air or gas are disclosed in U.S. Pat. No. 6,976,834. Additionally, brazing in a furnace at high temperature, 900° C. to 1200° C., under vacuum is disclosed as a manufacturing process with controlled cooling under argon to prevent oxidation thusly presenting an opportunity to introduce vacuum into the thermal stabilization cavities.

German Patent Application No. DE 100 02 408 and German Patent Utility Model No. DE 200 05 026 disclose a hollow space or a multiplicity thereof in the inner region of the nozzle plate and the nosecone extension to enhance temperature control by virtue of the reduction of mass necessitating temperature maintenance and thusly introducing thermal insulation. Use of solid, liquid, or gas as insulating materials is disclosed therein.

World Patent Application Publication No. WO2003/031132 discloses the use of ceramic plates for insulation of the die face from the heated portion of the die body.

Finally, Austrian patent application AT 503 368 A1 discloses a thermally insulated die plate assembly with a detachable face plate that is sealed to the discharge end of the extrusion orifice nozzles by an O-ring or metal seal. This die plate assembly is very fragile and highly susceptible to process melt leakage, thus requiring considerable maintenance.

There is, therefore, a need for a thermally insulated die plate assembly which is robust in construction, retains the air pocket in a sealed condition, requires low maintenance and provides high performance.

SUMMARY OF THE INVENTION

The thermally insulated die plate assembly of the present invention is installed in a conventional manner between the melting and/or mixing devices and the pellet transport components including mechanical, pneumatic, and/or fluid conveyance. The upstream side of the insulated die plate assembly receives molten polymer or other fluidized material from the melting/mixing devices that is subsequently extruded through the multiplicity of orifices extending from the upstream side to the downstream side of the die plate assembly to form extruded strands of material. The extruded strands, with at least marginal cooling, are cut into pellets by rotating cutter blades engaging a cutting surface or cutting die face associated with the downstream side of the die plate in a manner well known in the art of pelletizing.

The thermally insulated die plate assembly of the present invention is retained in position in a conventional manner by fasteners that connect the melting and mixing components, the die plate, and the pellet transport components. The nose cone, optionally a separate component, is retained in position as required by the normally provided nose cone anchor bolt as is understood by those skilled in the art. Similarly, thermal regulation fluid as required enters and exits chambers in the die plate through conventional inlet and outlet orifices, respectively.

The thermally insulated die plate assembly in accordance with the present invention is essentially formed by machining a cutout in the downstream side or die face side of a die plate body, preferably forming a generally circular cavity. The periphery of the cutout cavity should extend beyond the circular pattern or array of extrusion orifices or die holes with a raised circular ridge which matches and encompasses the circular pattern or array of extrusion orifices or die holes. The raised circular ridge thus divides the cutout cavity into, preferably, an annular outer section and a circular inner section. The raised circular ridge is preferably trapezoidal in vertical cross-section with the extrusion orifices extending centrally therethrough. Orifice protrusions project from the upper surface of the raised ridge at the extrusion orifice locations so that the extrusion orifices extend through the orifice protrusions.

Finally, a cover plate with holes matching the orifice protrusions is sized to fit over and into the cutout cavity in the die plate body to complete the downstream side of the die plate assembly and form a generally planar die face. In addition, the upstream side of the cover plate is machined with a counterbore which conforms to the configuration of the orifice protrusions and defines the outside wall of the air cavity around the orifice protrusions and the raised circular ridge. The cover plate is attached around its periphery to the die plate body and attached around its matching holes to the distal end of the orifice protrusions adjacent the die face.

The thickness of the cover plate is less than the depth of the cutout cavity so that when the cover plate is in place a thin, generally flat, continuous air pocket or air chamber is formed around the raised circular ridge and associated orifice protrusions, which air chamber is generally parallel to the die face. The thickness of the air chamber is on the order of about 0.05 millimeters (mm) to about 6.0 mm, and preferably about 0.5 mm to about 1.0 mm. Stated another way, the thickness of the air chamber is preferably about 5% to about 10% of the thickness of the die plate assembly.

The raised circular ridge and associated orifice protrusions which encompass and extend the extrusion orifices from the base of the cutout cavity to the matching holes of the cover plate are together referred to herein as the "extrusion orifice extensions". The extrusion orifice extensions for each of the extrusion orifices or die holes extend fully through the air chamber so that the orifice extensions are surrounded by the thermally insulating air.

The air chamber is preferably vented to the atmosphere outside the die plate assembly, such as through one or more channels in the die plate body to provide for atmospheric equilibrium of the air chamber. The air chamber thus forms a thermally insulating air pocket or chamber between the typically heated upstream side of the die plate assembly and the downstream side forming the die face, which contacts the cooling water of the waterbox in an underwater pelletizer, or other cooling medium associated with a rotating cutter hub and blade assembly.

The cover plate should be made of a chemical, corrosion, abrasion, and wear-resistant metal. The cover plate can contain at least one circumferential expansion groove on at least one face and preferably contains a multiplicity of circumferential expansion grooves on at least one face. When expansion grooves are formed on both faces, they are preferably arranged in a staggeringly alternating configuration. Preferably, the cover plate is welded in position with nickel steel. More preferably, the cover plate is attached by welding with nickel steel at peripheral grooves circumferentially surrounding the cover plate and at weld locations between the distal end of the orifice protrusions and the inside of the cover plate holes.

The die plate body of the thermally insulated die plate assembly according to the present invention can be thermally regulated by any suitable heating system known to those skilled in the art, such as thermal regulation fluid as required to enter and exit heating chambers in the die plate body to conventional inlet and outlet orifices, respectively. Alternatively, the die plate body can be thermally regulated by at least one of electrical resistance, induction, steam, and thermal transfer fluid. Preferably, the die plate body is heated by electric heaters in techniques known to those skilled in the art.

In a first embodiment of the present invention, the thermally insulated die plate assembly is configured with a one-piece die plate body. In a second embodiment of the present invention, the thermally insulated die plate assembly is configured with a two-piece die plate body having a removable center die insert thermally insulated in accordance with the present invention which is peripherally surrounded by a die plate outer ring thermally regulated by at least one of electrical resistance, induction, steam, and thermal transfer fluid.

As used herein the term "die plate body" is intended to include the body of the die plate when the assembly of the present invention is configured as a one-piece construction and the removable center die insert in combination with the die plate outer ring when the assembly is configured in a two-piece construction.

In addition to having the die face of uniform planarity, the annular cutting face containing the distal ends of the orifice protrusions, and through which penetrate the multiplicity of extrusion orifices, can be raised a certain distance above the remaining portion of the die face, as known to those skilled in the art. The rotating cutting blades thus engage the raised annular cutting face. The raised annular cutting face should be at least 0.025 millimeters higher than the surrounding die face and preferably is at least 0.50 millimeters above the surrounding die face.

Preferably, at least the surface of the annular cutting face engaged by the cutting blades is subjected to an enhancing surface treatment. The enhancing surface treatment includes at least one of nitriding, carbonitriding, electroplating, electroless plating, electroless nickel dispersion treatments, flame spraying including high velocity applications, thermal spraying, plasma treatment, electrolytic plasma treatments, sintering, powder coating, vacuum deposition, chemical vapor deposition, physical vapor deposition, sputtering techniques and spray coating. These surface treatments result in metallizing, attachment of metal nitride, metal carbides, metal carbonitrides, and diamond-like carbon and can be used singly and in any combination. Different surface treatments can be applied to different circumferential planes on the cutting face and should be at least approximately 0.025 millimeters in thickness. Preferably, the treatments are at least approximately 0.50 millimeters in thickness.

The raised circular ridge and associated orifice protrusions are formed in at least one annular ring, and each orifice protrusion can contain at least one to a multiplicity of extrusion orifices arranged in groups, pods, and clusters. The orifice protrusions can be of any geometry including at least one of oval, round, square, triangular, rectangular, polygonal, and in many combinations. Similarly, the orifice protrusions can be arranged concentrically, alternating, in a staggering configuration, and linearly, and can be positioned parallel to the arc of rotation of the cutting blades, perpendicular to the arc and including kidney to comma-like configurations.

In addition, the extrusion orifices can be of any geometry including but not limited to round, oval, square, rectangular, triangular, pentagonal, hexagonal, polygonal, slotted, radially slotted and any combination thereof. A multiplicity of extrusion orifices can be of different geometry in a particular orifice protrusion or die face.

In view of the foregoing, it is an object of the present invention to provide a die plate assembly in which the typically heated upstream portion of the assembly is thermally insulated from the typically cooled downstream portion adjacent the die face by an internal insulation air pocket or air chamber extending substantially parallel to the die face.

A further object of the present invention is to provide a thermally insulated die plate assembly in accordance with the preceding object in which the insulation air pocket or air chamber surrounds extrusion orifice extensions configured as a raised circular ridge and associated orifice protrusions, through which the extrusion orifices extend to the die face.

Another object of the present invention is to provide a thermally insulated die plate assembly in accordance with the preceding object in which the insulation air pocket or air chamber is formed by machining or cutting out a cavity in the downstream side of a die plate body leaving in place the raised circular ridge. The cavity is closed by a cover plate having a counterbore sized to match the extrusion orifice extensions and with holes to match the distal ends of the orifice protrusions.

Still another object of the present invention is to provide a thermally insulated die plate assembly in accordance with the two preceding objects in which the raised ridge has a trapezoidal shape in vertical cross-section to aid in channeling heat to the orifice protrusions and thus maintain the process melt at a desired temperature in the extrusion orifice at the die face.

A still further object of the present invention is to provide a thermally insulated die plate assembly in accordance with the preceding three objects in which the insulation air pocket or air chamber is configured to follow and surround the raised circular ridge and associated orifice protrusions so as to retain the heat in the raised ridge and orifice protrusions in order to maintain the process melt at a desired temperature in the extrusion orifices at the die face.

It is another object of the present invention to provide a thermally insulated die plate assembly in accordance with the preceding objects in which the insulation air pocket or air chamber is vented to the atmosphere outside of the die plate assembly to maintain the temperature and pressure conditions inside the cavity or chamber equilibrated to the atmosphere.

It is a further object of the present invention to provide a thermally insulated die plate assembly in accordance with the preceding objects in which the die plate body is configured in a single-body construction.

Yet another object of the present invention is to provide a thermally insulated die plate assembly in accordance with the preceding objects in which the die plate body is configured in a two-piece construction including a removable center die insert surrounded by a die plate outer ring.

Still yet a further object of the present invention is to provide a thermally insulated die plate assembly in accordance with the preceding object in which the removable insert and the die plate outer ring can be individually and/or separately heated or thermally regulated.

A final object to be set forth herein is to provide a thermally insulated die plate assembly which will conform to conventional forms of manufacture, will have improved strength and robustness, will maintain the insulating air pocket tightly sealed to provide improved thermal insulation in operation, and will be economically feasible, long-lasting and relatively trouble-free in use.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
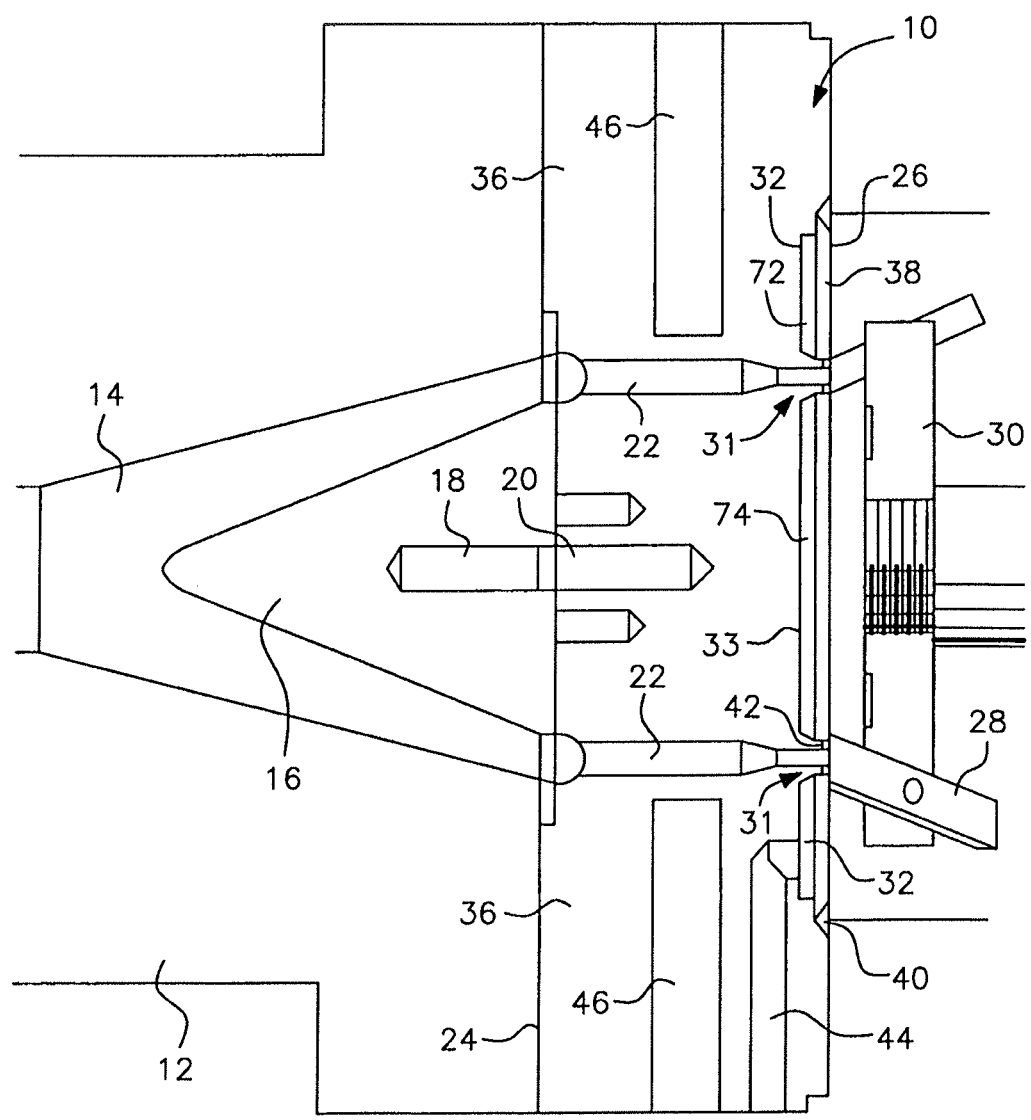
FIG. 1 is a schematic vertical sectional view of a first embodiment of a thermally insulated die plate assembly in accordance with the present invention in which the assembly is of a single body construction.

Although only preferred embodiments of the invention are explained in detail it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Figure 2:
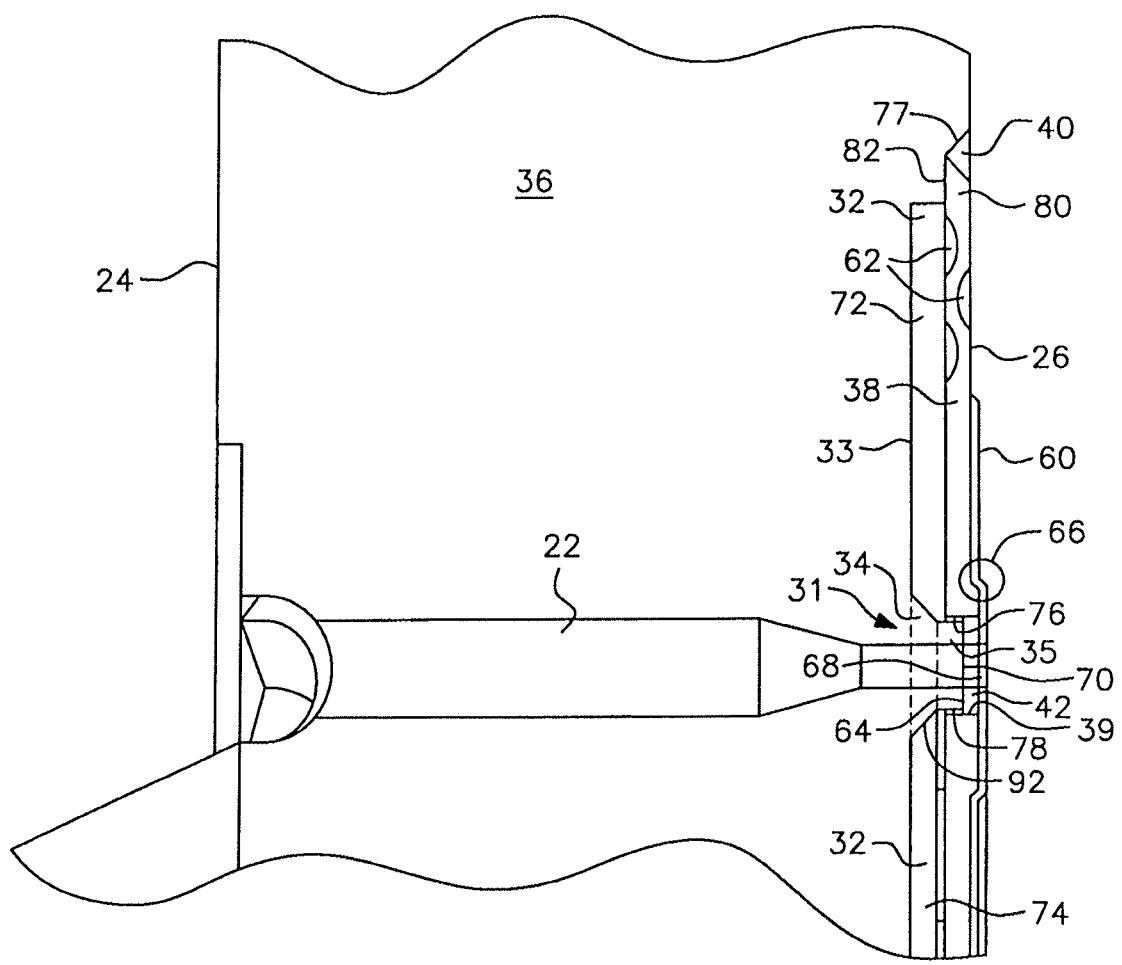
FIG. 2 is an enlarged schematic vertical sectional view illustrating further details of the components around an upper extrusion orifice for the embodiment shown in FIG. 1.
Figure 3:
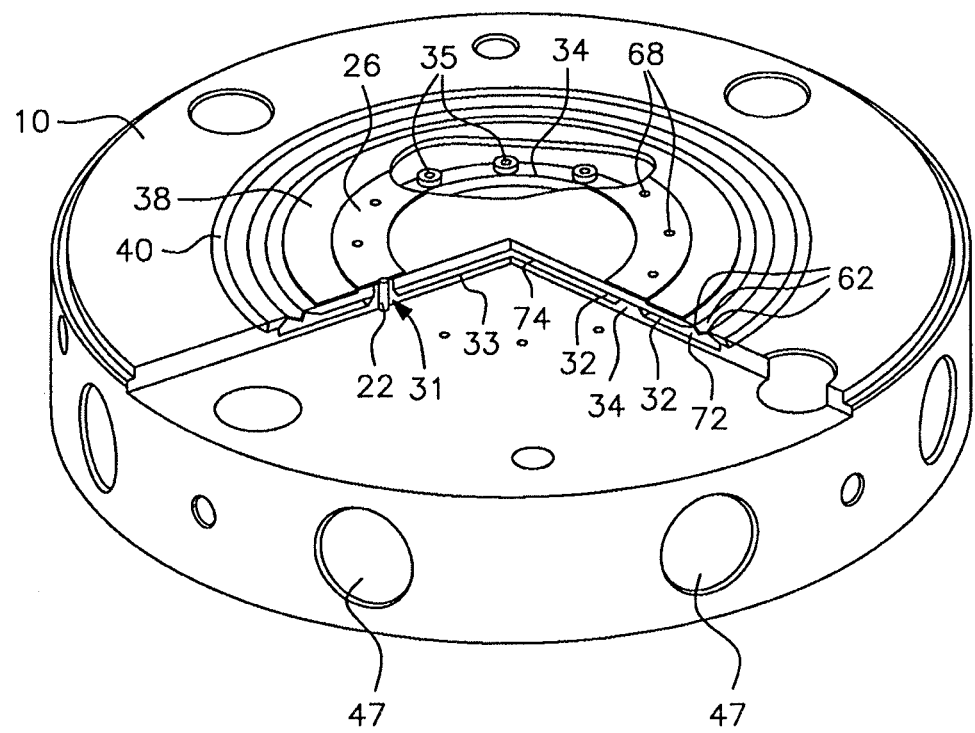
FIG. 3 is a partial cut-away perspective view of the die plate assembly shown in FIG. 1, illustrating the association of the various components.

Referring to the drawings, FIGS. 1, 2 and 3 illustrate one embodiment of the present invention associated with components of a pelletizer, such as an underwater pelletizer. The pelletizer includes an inlet housing 12 from a melting and/or mixing apparatus (not shown). The inlet housing includes a passageway 14 for molten material or other extrudate (hereinafter collectively referred to as "process melt") that can include organic materials, oligomers, polymers, waxes, and combinations thereof without intending to be limited. Nose cone 16 directs the process melt to the upstream side of the single-body or one-piece die plate assembly constructed in accordance with the present invention and generally designated by reference numeral 10. The nose cone 16 can be attachedly connected to the die plate assembly by a threaded rod (not shown). The threaded rod is screw threaded at one end into threaded bore 18 of nose cone 16 and at its distal end into threaded bore 20 of die plate 10. Alternately, the nose cone 16 can be rigidly affixed to or unitary with the die plate 10 and need not be attachedly connected as herein described.

The single-body die plate assembly 10 contains a multiplicity of extrusion orifices 22 concentrically arranged singly or in multiples thereof in at least one annular ring that extends from the upstream face 24 to the downstream face or die face 26 of the die plate assembly 10. A plurality of cutter blades 28 mounted on a rotatably driven cutter hub 30 in a cutting chamber (not shown) cut the extruded and at least partially solidified process melt extruded through orifices 22 into pellets at the cutting surface of the die face 26. The pellets thusly formed are transported mechanically, pneumatically, hydraulically, or in combinations thereof to downstream processing, such as a dewatering system, drying equipment and the like.

The die plate assembly 10 is made up with two major components, die plate body 36 and cover plate 38. A thin, continuous air pocket or air chamber 32, parallel to die face 26, is formed between the downstream side of the die plate body 36 and the upstream side of the cover plate 38. In order for the extrusion orifices 22 to pass through the air chamber 32, the extrusion orifices 22 extend through a raised circular ridge 34 formed in the downstream face of the die plate body and orifice protrusions 35 positioned on top of the ridge 34 (see FIG. 2), which together define the extrusion orifice extensions, generally designated by reference numeral 31.

The upstream side of the cover plate 38 is provided with a generally circular counterbore 76 which conforms to and receives the circular array of orifice protrusions 35. The counterbore 76 has outlet holes 39 which match the orifice protrusions 35 and form the distal ends 68 of the extrusion orifices 22. The distal ends 70 of protrusions 35 then fit into the matching holes 39 in the cover plate 38. The raised circular ridge 34 and associated heat conducting protrusions 35, which encompass and provide heat to the distal end 68 of the extrusion orifices 22, thus extend through and are surrounded by the air chamber 32.

In order to form the air pocket or air chamber 32, the central area of the downstream face 26 of die plate body 36 is machined or cut out to provide a circular recess or cavity 33. The cavity 33 extends beyond the extrusion orifices 22 and is preferably formed with the raised circular ridge 34 in place, although the ridge could be formed as a separate piece and welded or otherwise attached to the bottom of the cavity 33. The raised ridge thus divides the cavity 33 into an annular outer section 72 and an inner circular section 74. The orifice protrusions 35 can also be formed during the machining process and thus be integral with the raised ridge 34. However, preferably, the protrusions 35 are configured as separate collars of the same material as the die plate body 36 (and ridge 34) and are adhered to the top of ridge 34 as by welding or the like.

Circular cover plate 38 with holes 39 matching the distal ends 70 of the orifice protrusions 35 overlays the recess cavity 33 and is attachedly connected to die plate body 36 and to orifice protrusions 34 by brazing, welding, or similar technique known to those skilled in the art. Preferably, the cover plate 38 is constructed of an abrasion and corrosion resistant metal and, more preferably, is constructed of nickel steel. Similarly, attachment of the cover plate 38 to the die plate body 36 and to the distal ends 70 of orifice protrusions 35 is preferably achieved by welding and, more preferably, is achieved by nickel steel welding. Weldments 40 and 42 are preferentially made at circumferential grooves 77 peripherally about the cover plate 38 and into the cover plate holes 39 which are sized to expose a portion of the distal end 70 of protrusions 35 for welding or the like. To assist in rigidifying the cover plate 38 to the die plate body 36, the peripheral edge 80 is designed to rest on ledge 82 cut into the downstream face of the die plate body. The peripheral edge 80 and the die plate body 36 have opposing chamfers which form groove 77 for receiving the peripheral weld 40 and maintain the peripheral edge 80 solidly against the ledge 82.

The surface of the cover plate 38 and thus the downstream face 26 is preferably coated with a chemical, abrasion, corrosion, and wear resistant coating 60 as described hereinbelow. Once weldment 42 is in place, along with wear resistant coating 60, if included, the distal end 68 of the extrusion orifices 22 can be completed by machining from the downstream side of the die plate assembly, such as with an EDM machine or otherwise as known by those skilled in the art, thus clearing any weld 42 and coating 60 from the extrusion orifice distal end 68.

The raised circular ridge 34 is preferably trapezoidal in vertical cross-section to aid in channeling heat to the orifice protrusions 35, which transfer the heat from the raised ridge to the die face 26, thus maintaining the process melt at a desired temperature in the extrusion orifice distal end 68, and to assist in creating a robust thermally insulated die plate assembly. While a trapezoidal cross-section for the raised circular ridge is preferred, other shapes for the ridge cross-section could be designed by those skilled in the art in order to achieve the foregoing goals, as contemplated by the present invention.

The assemblage as heretofore described encloses the circular recess 33 to form the thin, continuous thermal air pocket or air chamber 32 which is preferably connected to the surrounding atmosphere by at least one vent tube 44. Variation in temperature and/or pressure within the die plate body 10 equilibrates by expansion or contraction of air into and through vent tube 44 thus avoiding vacuum formation and/or pressure build-up which could potentially lead to undesirable deformation of the downstream face 26. Raised ridge 34 and orifice protrusions 35 through-penetrate the atmospheric air pocket 32 to provide continuous and more uniform heating along the length of the through-penetrating extrusion orifices 22, and the weldment of their distal ends 70 to the openings 39 in the cover plate 38 serve to strengthen and maintain the planar shape of the cover plate.

As best seen in FIG. 2 the air pocket or chamber 32 is generally parallel to the die face 26, but extends into the counterbore 76, as at 78, in order to surround the outer periphery of each orifice protrusion 35. The thickness of the air chamber 32 can vary at different locations but should be at least about 0.05 mm to no more than about 6.0 mm deep, and preferably is about 0.5 mm to about 1.0 mm deep. Stated another way, the thickness of the air chamber 32 in the dimension parallel to the die face is preferably about 5% to about 10% of the thickness of the die plate assembly 10.

Cover plate 38 preferably includes at least one circumferential expansion groove 62 on the portion of the cover plate 38 that extends beyond the circular array of extrusion orifices 22. More preferably, at least one circumferential expansion groove 62 is on each side of cover plate 38 outside the array of extrusion orifices. Still more preferably, a multiplicity of circumferential expansion grooves 62 are positioned staggeringly on opposite sides of the cover plate 38. The circumferential expansion grooves 62 can be of any geometry in profile including but not limited to square, angular, rounded, and hemispherical and the multiplicity of grooves on cover plate 38 can be of similar or differing geometries. Preferably, the circumferential grooves are rounded in profile as shown in FIG. 2.

As described previously, the raised circular ridge 34 of the extrusion orifice extensions 31 is preferably unitary with die plate body 36 and therefore of the same chemical composition. The orifice protrusions 35, on the other hand, are formed as separate collars and attachedly connected to the top of the raised ridge as by brazing, welding, and any similar mechanism known to those skilled in the art. The protrusions 35 can be of similar or differing composition to the ridge 34 and die plate body 36 of which the composition can include but is not limited to tool steel, hardened tool steel, stainless steel, nickel steel, and the like.

Turning to FIGS. 4 through 9 there is shown a two-piece die plate assembly, generally designated by reference numeral 100, in accordance with a second embodiment of the present invention. The die plate assembly 100 includes a die plate outer ring 105 and removable center die insert 106. Since many of the components of the die plate assembly 100 are the same as or very similar to the components of the die plate assembly 10, the same reference numerals are carried forward from the latter for corresponding components in the former, but preceded by the "1" digit.

Similarly to the FIG. 1 embodiment, the die plate assembly 100 is attachedly connected to an inlet housing 112 from a melting and/or mixing apparatus (not shown). The inlet housing 112 includes a passageway 114 for process melt as heretofore described. Nose cone 116 directs the process melt to the upstream side 124 of the removable insert 106 to which it is attachedly connected by threaded rod (not shown). The threaded rod is screw threaded at one end into threaded bore 118 of nose cone 116 and at its distal end into threaded bore 120 of removable insert 106.

The removable center die insert 106 includes a multiplicity of extrusion orifices 122 concentrically arranged singly or in multiples thereof in at least one annular ring that extends from the upstream face 124 to the downstream face 126 of removable insert 106. A plurality of knife blade assemblies 128 mounted on a rotatably driven cutter hub 130 in a cutting chamber (not shown) cut the extruded and at least partially solidified process melt into pellets. The pellets thusly formed are transported mechanically, pneumatically, hydraulically, or in combinations thereof to downstream processing as before.

The central areas of the downstream face 126 of insert 106 are machined or cut out to provide a central circular recess or cavity 133 in the same manner as described above for the first embodiment, including raised circular ridge 134 and orifice protrusions 135, which together define the extrusion orifice extensions 131 and encase the extrusion orifices 122 through the cavity 133. A circular cover plate 138 with holes 139 matching the distal ends 170 of the orifice protrusions 135 overlays the recess cavity 133 to form a thin, continuous thermal air pocket or air chamber 132 across the insert 106 generally parallel to the die face 126. The upstream side of cover plate 138 is also provided with a generally circular counterbore 176 which includes the outlet holes 139 and conforms to and receives the circular array of orifice protrusions 135. The extrusion orifice extensions 131 made up of the raised circular ridge 134 and orifice protrusions 135 serve to channel and provide heat from the insert body 136 to the distal end 168 of the extrusion orifices 122, while at the same time the extensions 131 are thermally insulated from cover plate 138 by the air chamber 132 which surrounds the orifice extensions 131.

The cover plate 138 is attachedly connected to the periphery of the insert body 136 and to orifice protrusion distal ends 170 by brazing, welding, or similar technique known to those skilled in the art. Preferably, the cover plate 138 is constructed of an abrasion and corrosion resistant metal and more preferably is constructed of nickel steel. Similarly, attachment of the cover plate 138 to the insert body 136 and orifice protrusion distal ends 170 is preferably achieved by welding and, more preferably, is achieved by nickel steel welding. Weldments 140 and 142 are preferentially made at circumferential grooves 176 peripherally about the cover plate 138 and onto protrusion distal ends 170 at weldment locus 142 (see FIG. 9). The surface of the cover plate 138 and thus the downstream face 126 of die insert 106 is preferably coated with a chemical, abrasion, corrosion, and wear resistant coating as described hereinbelow.

The circular cavity 133 is preferably connected to the surrounding atmosphere by at least one vent tube 144 which passes through both the removable die insert 106 and the die plate outer ring 105. Variation in temperature and/or pressure within the air chamber 132 equilibrates by expansion or contraction of air into and through vent tube 144, thus avoiding vacuum formation and/or pressure build-up which could potentially lead to undesirable deformation of the downstream face 126. Raised ridge 134 and orifice protrusions 135 through-penetrate the atmospheric air pocket 132 to provide continuous and more uniform heating along the length of the extrusion orifices encompassed therewithin. The configuration of the raised circular ridge 134, preferably trapezoidal in vertical cross-section, serves to channel heat to the orifice protrusions 135 in order to assist in maintaining the process melt in protrusions 135 at the desired temperature prior to exit from the distal end 168 of extrusion orifices 122. Weldment of the periphery of the cover plate 138 to the insert 106 and of the distal ends 170 of the orifice protrusions 135 in the holes 139 of the cover plate 138 serve to strengthen and rigidify the cover plate in its planar shape, as further described in the next paragraph.

The insert body 136 and cover plate 138 are designed with a multitude of complementary abutting surfaces to improve the effectiveness of the weldments 140 and 142. This in turn increases the rigidity of the assembled cover plate 138 onto the insert body 136, improves the sealing of the air chamber 132 and provides an overall robust die plate assembly 110. First, the machined cutout 133 includes peripheral ledge 182 (see FIGS. 6 and 7) which receives a peripheral edge 184 of the cover plate 138 to define the periphery of the air chamber 132. The complementary abutting surfaces of the insert body peripheral ledge 182 and cover plate peripheral edge 184 are then held together by weldment 140. Second, holes 139 of cover plate 138 include a countersunk section 186 on their upstream side (see FIG. 8) which forms a ledge 188 that engages the outer periphery of the distal ends 170 of the orifice protrusions 135 (see FIG. 9). These complementary abutting surfaces 170 and 188 are adhered together by weldments 142 at each extrusion orifice 168.

The circular counterbore 176 in cover plate 138 differs from the circular counterbore 76 in cover plate 38 in that the former is contoured with tapered side walls 190 to more closely follow the contour of the tapered sides 192 of the raised ridge 134. By more closely following the contour of raised ridge 134, the counterbore 176 and resultant air chamber 132 provide additional insulation about the ridge 134 and the associated orifice protrusions 135. In contrast, the circular counterbore is more rectangular in cross-section and is positioned adjacent the raised ridge 34 without contouring dimensionally with its tapered sides 92. It is understood that the contours of the circular counterbore 176 adjacent raised circular ridge 134 and of the counterbore 76 adjacent raised ridge 34 are only two non-limiting examples and other designs comparable to and intermediate between these two configurations are encompassed by the present invention. Use of the rectangular counterbore 76 and tapered counterbore 176 can be applied to the solid-body die plate assembly 10 as well as to the two-piece die plate assembly 100.

If desired, cover plate 138 can be provided with circumferential grooves, such as grooves 62 illustrated and described above for cover plate 38.

Figure 4:
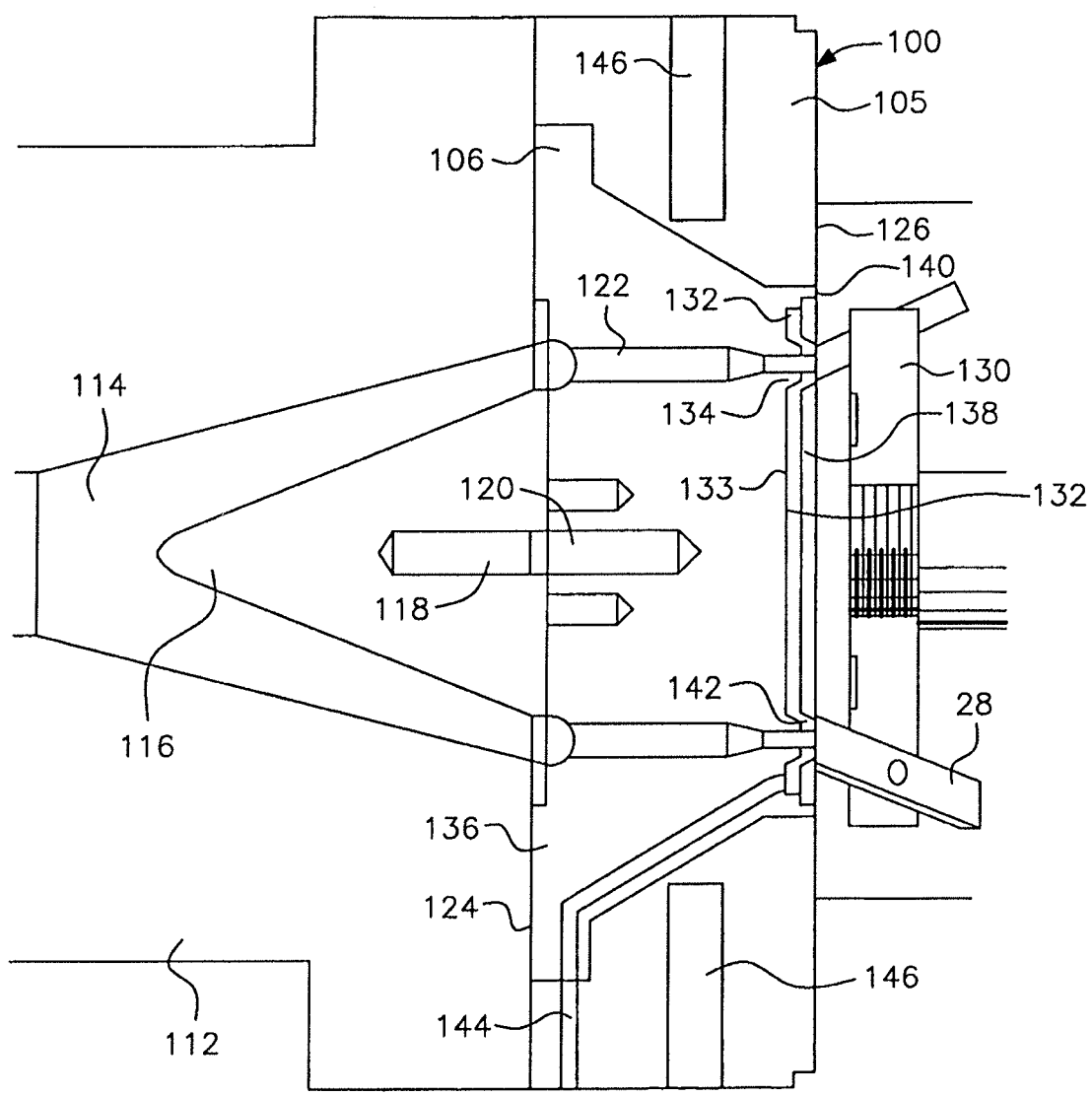
FIG. 4 is a schematic vertical sectional view of a second embodiment of a thermally insulated die plate assembly in accordance with the present invention in which the assembly is of a two-piece construction, including a removable center die insert and die plate outer ring.
Figure 5:
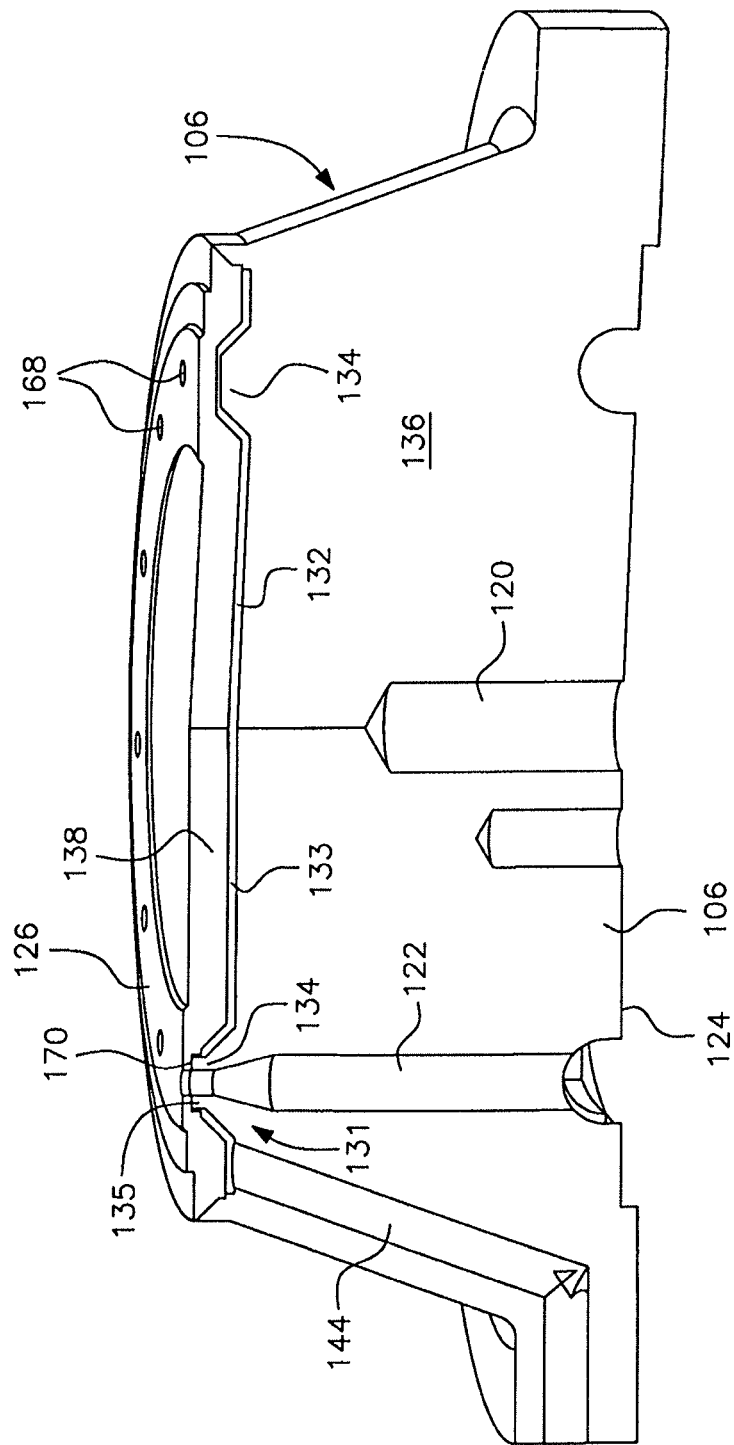
FIG. 5 is a schematic vertical cut-away side perspective view of one-half of the removable center insert of the die plate assembly shown in FIG. 4.
Figure 6:
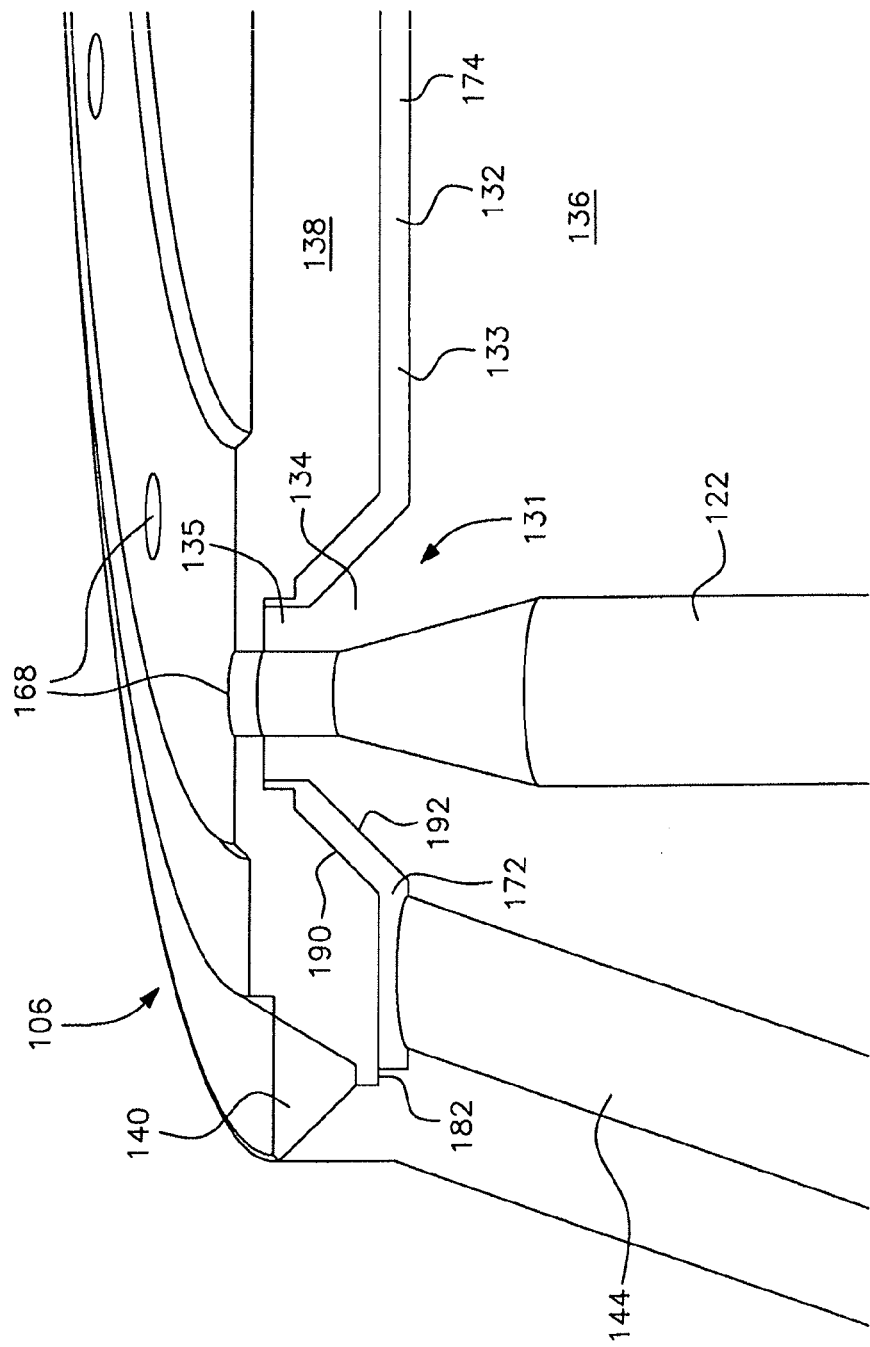
FIG. 6 is an enlarged view of the components shown in FIG. 5, illustrating the detail of the air chamber around the raised circular ridge and the orifice protrusion.
Figure 7:
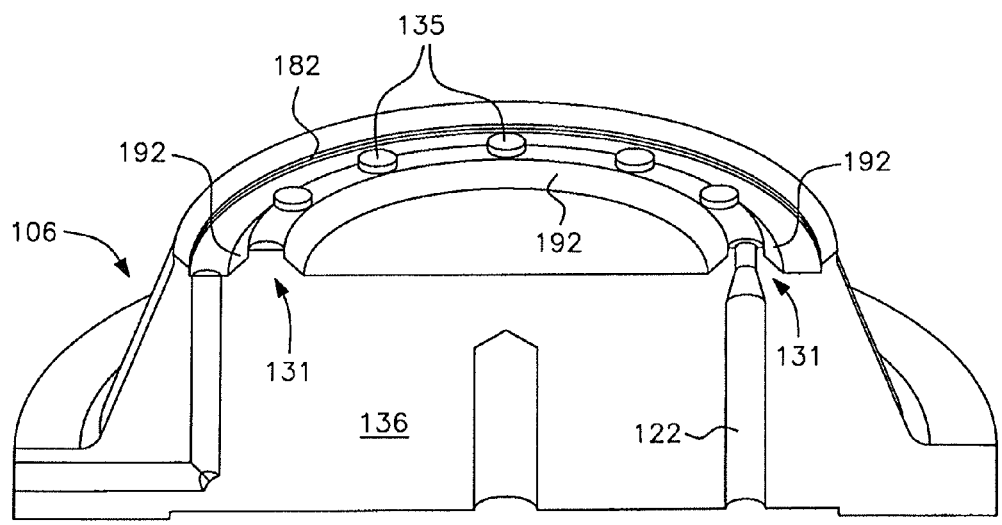
FIG. 7 is a schematic top perspective view of one-half of the removable center insert of the die assembly shown in FIG. 4, showing the design of the raised circular ridge and the orifice protrusions associated therewith.
Figure 8:
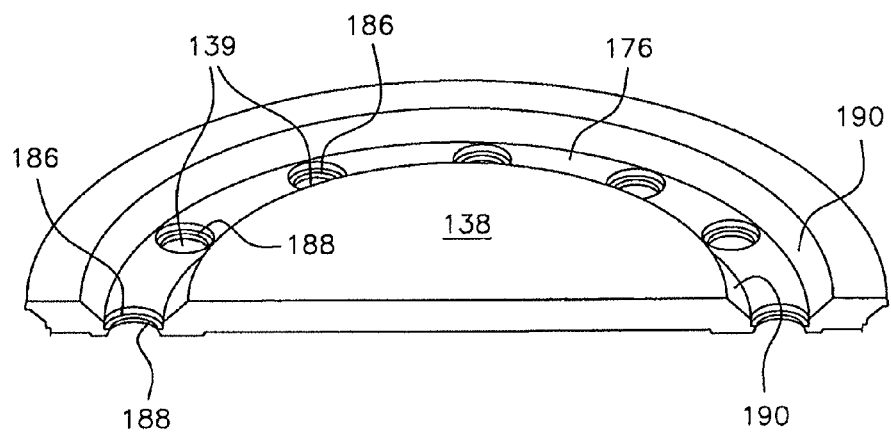
FIG. 8 is a schematic bottom perspective view of a cover plate which, when turned over, is assembled onto the top of the removable center insert shown in FIG. 7 to form the air pocket or air chamber of the die plate assembly shown in FIG. 4.

Heating and/or cooling processes can be provided by electrical resistance, induction, steam or heat transfer fluid as has been conventionally disclosed for the single-body die plate 10 as well as the two-piece die plate assembly 100. As shown in FIGS. 1 and 4, the die plate body 36 and insert body 136 are each respectively heated by radial electric heaters 46 and 146 positioned in radial slots 47 such as shown in FIG. 3, as well known in the art. In the two-piece die plate assembly 100 shown in FIG. 4, the removable insert 106 and the die plate outer ring 105 can each be separately heated by similar or differing mechanisms.

Figure 10:
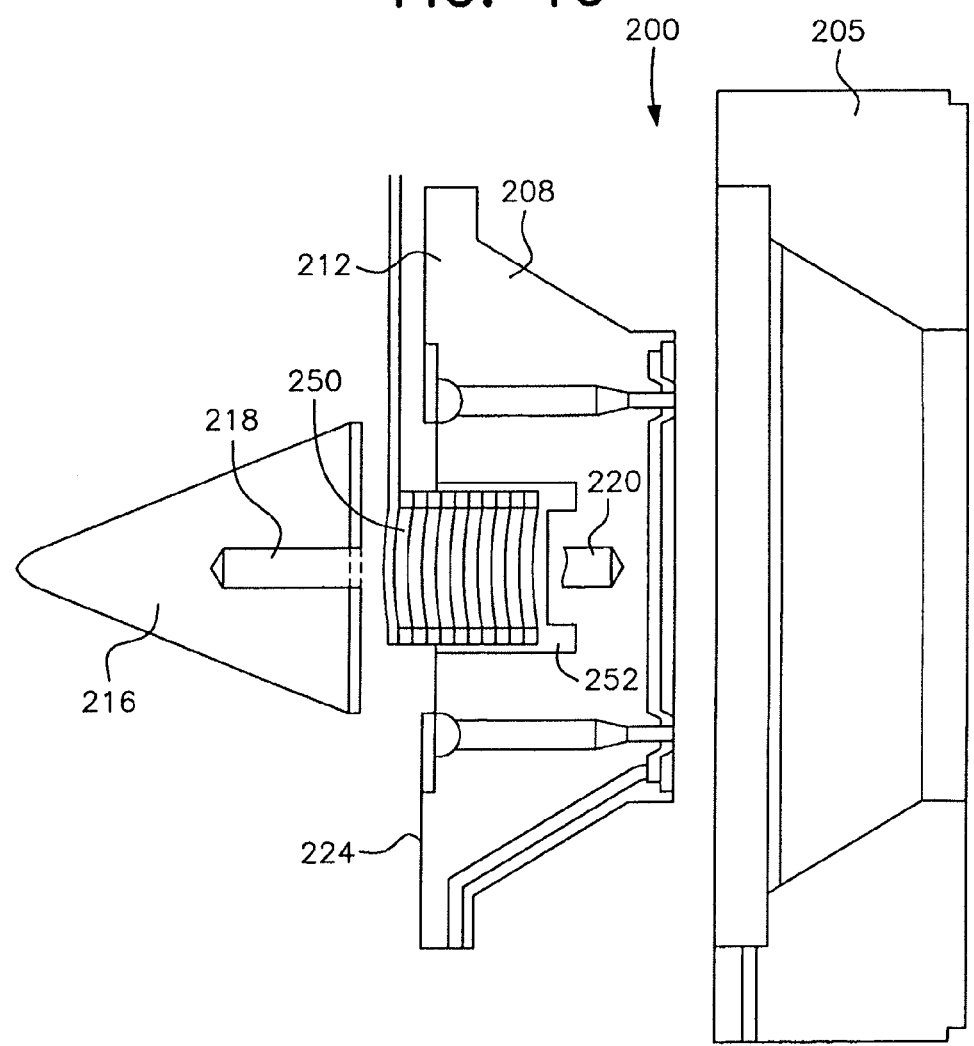
FIG. 10 is an exploded schematic vertical section view of a thermally insulated die plate assembly similar to FIG. 4 in which the removable center insert includes a separate center heating coil.
Figure 11A:
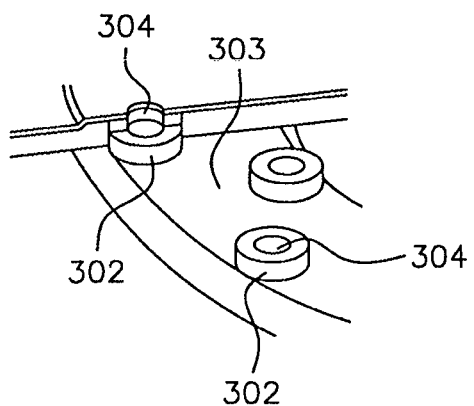
FIGS. 11a-g are a composite perspective view illustrating various configurations for the heat conducting protrusions in accordance with the present invention.
Figure 11B:
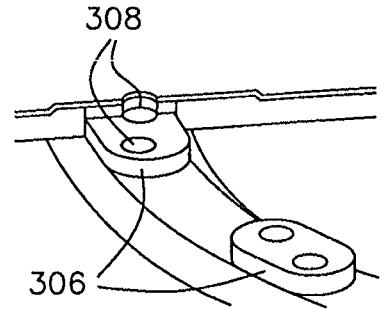
Figure 11C:
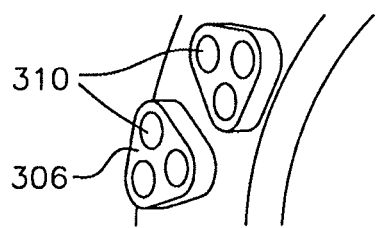
Figure 11D:
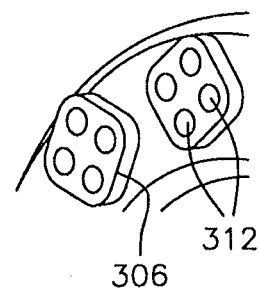
Figure 11E:
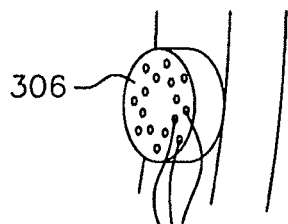
Figure 11F:
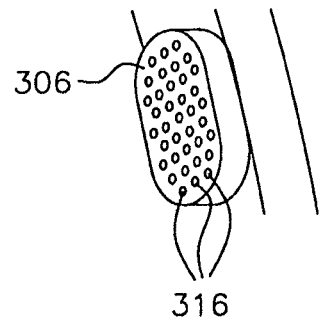
Figure 11G:
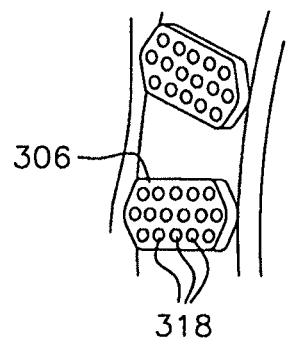

For example, FIG. 10 illustrates a partially exploded view of a die plate assembly, generally designated by reference numeral 200, which includes a center-heated removable insert 208. Since many of the components of the die plate assembly 200 are the same as or very similar to the components of the die plate assembly 100, the same reference numerals are carried forward from the latter for corresponding components in the former, but preceded by the "2" digit instead of the "1" digit.

The die plate assembly 200 thus includes a die plate body, generally designated by reference numeral 212, comprised of die plate outer ring 205 surrounding center-heated removable insert 208. The electrical resistance coil 250 is contained in an annular recess or cavity 252 centrally located within the insert 208 adjacent to the upstream face 224. Nose cone 216 is attachedly connected to removable insert 208 through use of a threaded rod (not shown) that is screw threaded at one end into threaded bore 218 of nose cone 116 and at its distal end into threaded bore 220 of removable insert 208 in a manner similar to that shown in FIGS. 1 and 4. When attached, nose cone 116 closes off cavity 252 with coil 250 positioned therein. Other methods of fastening are well-known to those skilled in the art. The removable insert 208 can thus be heated separately as by electric radial heaters 146 hereinbefore described in connection with the die plate assembly 100 shown in FIG. 4.

Figure 9:
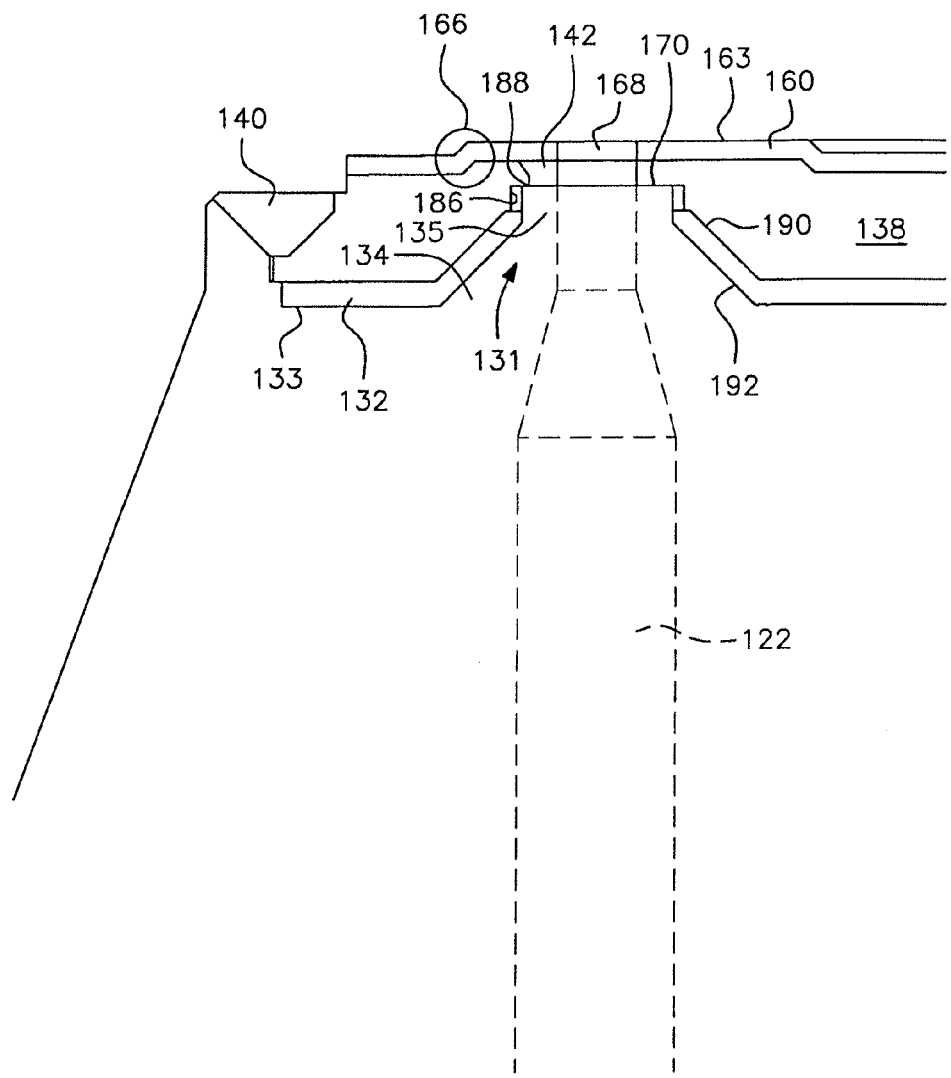
FIG. 9 is an enlarged schematic vertical section view showing the cover plate of FIG. 8 assembled onto the removable insert shown in FIG. 7 with the welds in place around the periphery of the cover plate and around the extrusion orifices, together with a hard face on the downstream surface of the cover plate.

The downstream face 26, 126 of die plate assembly 10, 100, 200 can be in one plane as shown in FIG. 1 but preferably is of two parallel planes as indicated by the encircled area 66, 166 in FIGS. 2 and 9, wherein the area adjacent to the outlets 68, 168 of extrusion orifices 22, 122 is raised in a plane parallel to that of the downstream face 26, 126. The elevation of the plane above that of the downstream face 26 should be at least approximately 0.025 mm, and preferably is at least approximately 0.50 mm.

Similarly, the recess cavity 33, 133 is at least approximately 1.05 millimeters in depth, preferably on the order of 5.0 mm to 7.0 mm. The thickness of the cover plate 38, 138 should be on the order of 1.0 mm to 8.0 mm, preferably about 6.0 mm in order to provide a thickness of the air chamber 32, 132 on the order of about 0.05 mm to about 6.0 mm, and preferably about 0.5 mm to about 1.0 mm.

The surface of the downstream face 26, 126 is preferably subjected to a chemical, abrasion, corrosion, and/or wear resistant treatment, i.e., "surface treatment," in the annular area generally defined by the array of extrusion orifice outlets 68, 168 and identified by the numeral 60, 160 in FIGS. 2 and 9. This annular area includes the cutting face 63, 163 where the cutting blades engage the die face. The surface treatment should be at least approximately 0.025 mm, and preferably is at least approximately 0.50 mm. The composition of the surface treatment 60, 160 can be different in the planar area surrounding the extrusion orifice outlets 68, 168 than that on other parts of the downstream face 26. Preferably, the surface treatment 60, 160 is the same on all faces and can involve one, two, or a multiplicity of processes inclusive and exemplary of which are cleaning, degreasing, etching, primer coating, roughening, grit-blasting, sand-blasting, peening, pickling, acid-wash, base-wash, nitriding, carbonitriding, electroplating, electroless plating, electroless nickel dispersion treatments, flame spraying including high velocity applications, thermal spraying, plasma treatment, electrolytic plasma treatments, sintering, powder coating, vacuum deposition, chemical vapor deposition, physical vapor deposition, sputtering techniques, spray coating, and vacuum brazing of carbides.

Surface treatment for all surfaces, other than the cutting face, includes flame spray, thermal spray, plasma treatment, electroless nickel dispersion treatments, high velocity air and fuel modified thermal treatments, and electrolytic plasma treatments, singly and in combinations thereof. These surface treatments metallize the surface, preferably fixedly attach metal nitrides to the surface, more preferably fixedly attach metal carbides and metal carbonitrides to the surface, and even more preferably fixedly attach diamond-like carbon to the surface, still more preferably attach diamond-like carbon in an abrasion-resistant metal matrix to the surface, and most preferably attach diamond-like carbon in a metal carbide matrix to the surface. Other ceramic materials can be used and are included herein by way of reference without intending to be limiting. These preferred surface treatments can be further modified optionally by application of conventional polymeric coating on the downstream face 26, 126 distal from the extrusion orifice outlet 68, 168. The polymeric coatings are themselves non-adhesive and of low coefficient of friction. Preferably the polymeric coatings are silicones, fluoropolymers, and combinations thereof. More preferably the application of the polymeric coatings requires minimal to no heating to effect drying and/or cure.

FIG. 11 illustrates additional configurations of extrusion orifices and orifice protrusions projecting from the raised circular ridge. FIG. 11a illustrates concentric rings of orifice protrusions 302 projecting from ridge 303 in staggered formation, each protrusion having a single extrusion orifice 304. The extrusion orifices can be oriented in a multiplicity of groups or pods 306 as illustrated in FIG. 11b for a grouping of two extrusion orifices 308, FIG. 11c for a grouping of three extrusion orifices 310, FIG. 11d for a cluster of four extrusion orifices 312, FIG. 11e for a pod of sixteen extrusion orifices 314, FIG. 11f for a multiplicity of thirty-seven extrusion orifices 316, and FIG. 11g for a multiplicity of sixteen extrusion orifices 318.

Groups, clusters, pods, and a multiplicity thereof can be arranged in any geometric configuration including but not limited to oval, round, square, triangular, rectangular, polygonal, and combinations thereof. The geometries of the orifice protrusions can be further rounded, angled, and chamfered and can contain any number of a multiplicity of orifices. Orientation of the geometries containing the multiplicity of orifices can be circumferentially and parallel to the arc, circumferentially and perpendicular to the arc, staggered and alternatingly circumscribing the arc and any combination thereof. Furthermore, the geometric orientation may conform to the arc as in a kidney shape or comma-shape. A multiplicity of concentric rings, at least one or more, of extrusion orifices can include extrusion orifices, singly or a multiplicity thereof, that can be arranged in a linear array, alternatingly, staggeredly, and any combination thereof relative to the other concentric rings in accordance with the instant invention.

Further, while the outlet of the extrusion orifices 22, 122, such as outlet 68 in FIG. 2 and outlet 168 in FIG. 9, is preferably round, the outlets can be of any geometry including but not limited to round, oval, square, rectangular, triangular, pentagonal, hexagonal, polygonal, slotted, radially slotted and any combination thereof. A multiplicity of extrusion orifice outlets 68 can be of different geometry in a particular protrusion 35.

Further, the extrusion orifice extensions may include more than one raised circular ridge 34, 134, depending upon the arrangement of the extrusion orifices and the width of the cutting blade. In addition, although at least one raised circular ridge 34, 134 is preferred to form the base of the extrusion orifice extensions 31, 131, it may be possible to design the extensions 31, 131 without any raised ridge. In such circumstances, the orifice protrusions 35, 135 would extend from the base of cutout 33, 133 to the respective opening 68, 168 of the cover plate 38, 138.

The foregoing is considered as illustrative only of the principles of the invention. Numerous modifications and changes will readily occur to those skilled in the art. Therefore, it is not desired to limit the invention to the exact construction and operation shown and described, and, accordingly, all suitable modifications and equivalents may be resorted to, falling within the scope of the invention.

What is claimed is:

1. A thermally insulated extrusion die plate assembly for a pelletizer including a plurality of extrusion orifices through which process melt is extruded to exit at a cutting face as a strand to be cut into pellets by a moving cutting assembly which comprises:
   (a) a die plate body having a central portion, said central portion of said die plate body being cut out on a downstream face of said die plate body to form a recess or a cavity that is centrally positioned in said downstream face;
   (b) at least one ring of extrusion orifice extensions extending through said cavity;
   (c) a cover plate sized to fit over said cavity and having openings which mate with said extrusion orifices therethrough to form said cutting face, said over plate attached to said die plate body over said cavity; said cover plate and said cavity forming and defining a thermally insulating centrally positioned air chamber in said assembly adjacent said cutting face, said orifice extensions through-penetrating said air chamber to surround and insulate said orifice extensions to provide continuous heating along a length of the through-penetrating orifice extensions and to prevent heat loss from the process melt adjacent the cutting face; and
   (d) an air vent open to a surrounding atmosphere outside the die plate assembly so that pressure build up is prevented and air in said air chamber is maintained at a same atmospheric pressure as air in said surrounding atmosphere outside of said die plate assembly.

2. The assembly as claimed in claim 1, wherein the die plate body is a single-body construction that is thermally regulated by at least one of electrical resistance, induction, steam, and thermal transfer fluid.

3. The assembly as claimed in claim 1, wherein the die plate body is a two-piece construction including a removable insert and a die plate outer ring that are thermally regulated by at least one of electrical resistance, induction, steam, or thermal transfer fluid.

4. The assembly as claimed in claim 3, wherein said removable insert and said die plate outer ring are independently thermally regulated by at least one of electrical resistance, induction, steam, or thermal transfer fluid.

5. The assembly as claimed in claim 1, wherein the cutting face is a raised annular plane through which penetrate the multiplicity of extrusion orifices and a lower peripheral plane about each side of said raised annular plane, said raised annular plane being at least about 0.025 millimeters higher than the lower peripheral plane.

6. The assembly as claimed in claim 1, wherein said cover plate has a counter-bore which conforms to a shape of said extrusion orifice extensions to further define said thermally insulating air pocket.

7. The assembly as claimed in claim 6, wherein said extrusion orifice extensions are configured as a raised circular ridge continuous and unitary with said die plate body and individual orifice protrusions attached to and extending from said raised circular ridge to said cover plate.

8. The assembly as claimed in claim 7, wherein said raised circular ridge is configured to channel heat to said orifice protrusions.

9. The assembly as claimed in claim 7, wherein said raised circular ridge has a cross-section of trapezoidal shape.

10. The assembly as claimed in claim 7, wherein said cover plate counter-bore is sized so that the thermally insulating air chamber follows a contour of the raised circular ridge.

11. The assembly as claimed in claim 1, wherein the cover plate contains at least one circumferential expansion groove on at least one face.

12. The assembly as claimed in claim 11, wherein the cover plate contains a multiplicity of circumferential expansion grooves on both faces in a staggered and alternating configuration.

13. The assembly as claimed in claim 1, wherein the cover plate is made of a nickel steel and is weldingly attached by nickel steel.

14. The assembly as claimed in claim 7, wherein the cover plate is weldingly attached to distal ends of said orifice protrusions at the openings in said cover plate.

15. The assembly as claimed in claim 1, wherein the air chamber atmospherically equilibrated by said air vent is at least 0.05 millimeters in depth.

16. The assembly as claimed in claim 7, wherein the orifice protrusions are through-penetrated by a multiplicity of extrusion orifices arranged in at least one of groups, pods, and clusters.

17. The assembly as claimed in claim 7, wherein the orifice protrusions are separate elements attachedly connected to the raised circular ridge on the die plate body.

18. A thermally insulated extrusion die plate assembly for a pelletizer including a plurality of extrusion orifices through which process melt is extruded to exit at a cutting face as a strand to be cut into pellets by moving cutting assembly which comprises:
  (a) a die plate body having a downstream face, a portion of said downstream face being cut out to form a recess or a cavity that is centrally positioned in said downstream face;
  (b) a cover plate sized to mate with and fit over said cavity, said cover plate and said cavity together forming and defining a thermally insulating air chamber in said die plate assembly adjacent said cutting face, said air chamber in direct communication with a surrounding atmosphere outside the die plate assembly to keep air in said chamber at atmospheric pressure; and
  (c) at least one ring of extrusion orifice extensions encasing said extrusion orifices through which the process melt is carried from said die plate body to openings in said cover plate to form said cutting face, said extrusion orifice extensions configured as a raised circular ridge continuous and unitary with said die plate body; and
  (d) a plurality of individual orifice protrusions extending outwardly from said raised circular ridge, distal ends of said protrusions being attachedly connected to said cover plate adjacent said cover plate openings, said raised circular ridge and said orifice protrusions through-penetrating said air chamber and being surrounded and insulated by said air chamber to provide continuous heating along a length of said extrusion orifice extensions and to prevent heat loss from the process melt adjacent the cutting face.

19. The assembly as claimed in claim 18, wherein said assembly includes a vent configured to equilibriatingly vent said thermally insulating chamber to an ambient atmosphere outside of said die plate assembly to prevent pressure build up and/or vacuum formation in said air chamber.

20. The assembly as claimed in claim 18, wherein said raised circular ridge is configured to channel heat to said orifice protrusions and said cover plate has a counter-bore which conforms to a shape of said extrusion orifice extensions and is sized so that the thermally insulating chamber follows a contour of the raised circular ridge.

21. The assembly as claimed in claim 18, wherein said cover plate and said orifice protrusions include complementary abutting surfaces where said orifice protrusions are welded to said cover plate adjacent said cover plate openings.

22. The assembly as claimed in claim 1 in combination with a pelletizer.

23. The assembly in combination with a pelletizer as claimed in claim 22 wherein the pelletizer is an underwater pelletizer.

24. The assembly as claimed in claim 7, wherein the orifice protrusions comprise at least one geometry including oval, round, square, triangular, rectangular, polygonal, or combinations thereof, can be arranged concentrically alternating, staggeredly, linearly, or combinations thereof, and can be parallel to an arc of the cutting face or perpendicular to the arc.

25. The assembly as claimed in claim 7, wherein the orifice protrusions are separate elements attachedly connected to the raised circular ridge on the die plate body.

26. The assembly as claimed in claim 1, wherein the extrusion orifice outlets comprise a shape of round, oval, square, rectangular, triangular, pentagonal, hexagonal, polygonal, slotted, radially slotted and any combination thereof.

27. The assembly as claimed in claim 18 in combination with a pelletizer.

28. The assembly in combination with a pelletizer as claimed in claim 27 wherein the pelletizer is an underwater pelletizer.

29. A thermally insulated extrusion die plate assembly for a pelletizer including a plurality of extrusion orifices through which process melt is extruded to exit at a cutting face as a strand to be cut into pellets by a moving cutting assembly and cooled by cooling water on a downstream side of said cutting face, in which the die plate assembly comprises:
  (a) a die plate body having a downstream face that includes a center section and a generally circular periphery, said center section of said downstream face having a generally circular cutout formed therein, said circular cutout being inset from and generally concentric with said periphery of said die plate body downstream face and extending across said downstream face center section;
  (b) at least one ring of extrusion orifice extensions encasing said extrusion orifices through which the process melt is carried from said die plate body to said cutting face; and
  (c) a circular cover plate sized to mate with and fit over said circular cutout, said cover plate having holes that receive distal ends of said extrusion orifice extensions, said cover plate and said cutout together forming and defining an air chamber inset into the downstream face of the die plate body and closed by said cover plate, said air chamber surrounding and thermally insulating said extrusion orifice extensions and said die plate body from heat loss that could otherwise occur due to a temperature of the cooling water adjacent said die face.

30. The assembly as claimed in claim 29, wherein said air chamber extends between and on either side of the extrusion orifice extensions, said extrusion orifice extensions dividing the air chamber into an outer section and an inner section.

31. The assembly as claimed in claim 29, wherein said extrusion orifice extensions are configured as a raised circular ridge continuous and unitary with said die plate body and having individual orifice protrusions extending from said raised circular ridge, distal ends of said orifice protrusions being attachedly connected to said cover plate adjacent said cover plate holes.

32. The assembly as claimed in claim 31, wherein said raised circular ridge is configured to channel heat to said orifice protrusions.

33. The assembly as claimed in claim 29, wherein said assembly includes a vent configured to equilibriatingly vent said air chamber to a surrounding atmosphere outside of said die plate assembly.

34. An underwater pelletizer for extruding and cutting a process melt into pellets comprising:
  a die plate body with a plurality of extrusion orifices formed therein through which the process melt is carried from said die plate body to a cutting face on a downstream side of said die plate body;
  a rotary cutter blade assembly in opposed relation to said cutting face, said cutter blade assembly having a hub and at least one cutter blade mounted on said hub and capable of moving in a plane generally parallel to and closely adjacent said cutting face to cut strands of process melt extruded through said orifices into pellets;

a water box having a cutting chamber enclosing said cutting face and cutter blade assembly, said water box including a water inlet for introducing cooling water into the cutting chamber and an outlet for discharge of water and pellets entrained in the water;

said die plate body having a portion of its downstream face cut out to form a recess or a cavity that is centrally positioned in said downstream face;

at least one ring of extrusion orifice extensions in said recess or cavity in said downstream face through which said extrusion orifices extend;

a cover plate sized to fit over said recess or cavity and having openings which mate with said extrusion orifices, said cover plate being attached to said die plate body over said recess or cavity in said downstream face to form said cutting face;

said cover plate and said recess or cavity forming and defining a thermally insulating air chamber adjacent said cutting face, said air chamber surrounding said extrusion orifice extensions to insulate said extrusion orifice extensions and provide continuous heating along a length of said extrusion orifices, said insulation provided by said air chamber surrounding said extrusion orifice extensions configured to prevent heat loss of the process melt adjacent the cutting face due to a temperature of the cooling water in the cutting chamber.

35. The assembly as claimed in claim 34, wherein said extrusion orifice extensions are configured as a raised circular ridge continuous and unitary with said die plate body and individual orifice protrusions extending from said raised circular ridge, distal ends of said orifice protrusions being attachedly connected to said cover plate.

36. The assembly as claimed in claim 35, further comprising radial electric heaters positioned in radial slots in said die plate body, said raised circular ridge being configured to channel heat from said electric heaters to said orifice protrusions.

37. The assembly as claimed in claim 36, wherein said cover plate has a counter-bore which conforms to a shape of said extrusion orifice extensions and is sized so that the thermally insulating air chamber follows a contour of the raised circular ridge, said raised circular ridge dividing said air chamber into a generally annular outer section and a generally circular inner section.

38. An underwater pelletizer for extruding and cutting a process melt into pellets comprising:

a die plate body with a plurality of extrusion orifices formed therein through which process melt is extruded to exit at a cutting face, said die plate body having a downstream face that includes a center section and a generally circular periphery, said center section of said downstream face having a generally circular cutout formed therein, said circular cutout being inset from and generally concentric with said periphery of said die plate body downstream face and extending across said downstream face center section;

a rotary cutter blade assembly in opposed relation to the cutting face on a downstream side of said die plate body, said cutter blade assembly having a hub and at least one cutter blade mounted on said hub and capable of moving in a plane generally parallel to and closely adjacent said cutting face to cut strands of process melt extruded through said orifices into pellets;

a water box having a cutting chamber enclosing said cutting face and cutter blade assembly, said water box including a water inlet for introducing cooling water into the cutting chamber and an outlet for discharge of water and pellets entrained in the water;

at least one ring of extrusion orifice extensions encasing said extrusion or through which the process melt is carried from said die plate body to said cutting face;

a circular cover plate having holes matching said extrusion orifice extensions and sized to mate with and fit over said circular cutout and ends of said extrusion orifice extensions, said cover plate and said cutout together forming and defining a generally circular air chamber inset into the downstream face of the die plate body and closed by said cover plate, said air chamber surrounding said extrusion orifice extensions and thermally insulating said die plate body from said cutting face to provide continuos heating along a length of the orifice extensions and to prevent heat loss from the process melt adjacent the cutting face; and radial electric heaters positioned in radial slots in said die plate body, said die plate body channeling heat from said heaters to said extrusion orifice extensions.

39. The assembly as claimed in claim 38, wherein said air chamber is vented to an atmosphere outside the die plate assembly to prevent pressure build up and/or vacuum formation in said air chamber.

40. The assembly as claimed in claim 38, wherein said extrusion orifice extensions are configured as a raised circular ridge continuous and unitary with said die plate body and include a plurality of individual orifice protrusions extending from said raised circular ridge, distal ends of said orifice protrusions being attachedly connected to said cover plate adjacent said cover plate holes.

* * * * *